(12) United States Patent
Hu

(10) Patent No.: US 12,034,947 B2
(45) Date of Patent: Jul. 9, 2024

(54) MEDIA DATA PROCESSING METHOD AND RELATED DEVICE

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 28 days.

(21) Appl. No.: 18/072,975

(22) Filed: Dec. 1, 2022

(65) Prior Publication Data

US 2023/0091266 A1  Mar. 23, 2023

Related U.S. Application Data

(63) Continuation of application No. PCT/CN2022/083960, filed on Mar. 30, 2022.

(30) Foreign Application Priority Data

Jun. 11, 2021 (CN) .......................... 202110656768.4

(51) Int. Cl.
*H04N 19/31* (2014.01)
*H04N 19/124* (2014.01)
*H04N 19/176* (2014.01)

(52) U.S. Cl.
CPC ........... *H04N 19/31* (2014.11); *H04N 19/124* (2014.11); *H04N 19/176* (2014.11)

(58) Field of Classification Search
CPC ..... H04N 19/31; H04N 19/124; H04N 19/176
(Continued)

(56) References Cited

U.S. PATENT DOCUMENTS

| 10,404,411 | B2 | 9/2019 | Chen et al. |
| 10,542,297 | B2 | 1/2020 | Chen et al. |

(Continued)

FOREIGN PATENT DOCUMENTS

| CN | 101518087 A | 8/2009 |
| CN | 106664446 A | 5/2017 |

(Continued)

OTHER PUBLICATIONS

The World Intellectual Property Organization (WIPO) International Search Report for PCT/CN2022/083960 dated Jun. 21, 2022 7 Pages (including translation).

(Continued)

*Primary Examiner* — Amir Shahnami
(74) *Attorney, Agent, or Firm* — ANOVA LAW GROUP, PLLC

(57) ABSTRACT

A media data processing method includes: acquiring a description data box of a $j^{th}$ track in the M tracks, the description data box including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, j being a positive integer, and $j \leq M$; and decoding the media data according to the temporal domain track indication information, thus improving the flexibility of multi-track encapsulation on different temporal domain layers.

20 Claims, 7 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 10,623,635 | B2 | 4/2020 | Wang et al. |
| 10,742,999 | B2 | 8/2020 | Wang et al. |
| 10,805,620 | B2 | 10/2020 | Wang et al. |
| 10,820,025 | B2 | 10/2020 | Lai et al. |
| 10,924,820 | B2 | 2/2021 | Chen et al. |
| 10,951,874 | B2 | 3/2021 | Chen et al. |
| 11,139,000 | B2 | 10/2021 | Wang et al. |
| 11,197,040 | B2 | 12/2021 | Wang et al. |
| 2010/0128112 | A1 | 5/2010 | Marti et al. |
| 2017/0171282 | A1* | 6/2017 | Denoual ................ H04N 19/46 |
| 2018/0075576 | A1 | 3/2018 | Liu et al. |
| 2019/0019218 | A1 | 1/2019 | Thompson et al. |
| 2020/0382764 | A1 | 12/2020 | Oyman et al. |
| 2022/0159261 | A1 | 5/2022 | Oh |

FOREIGN PATENT DOCUMENTS

| | | |
|---|---|---|
| CN | 112804256 A | 5/2021 |
| GB | 2506911 A | 4/2014 |

OTHER PUBLICATIONS

Shuai Zhao et al., "Study of User QoE Improvement for Dynamic Adaptive Streaming Over HTTP (MPEG-DASH)", 2017, pp. 566-570. International Conference on Networking and Communications (ICNC).

Kiang Zhang et al., "Linear Model based Geometry Coding for Lidar Acquired Point Clouds", 2020, pp. 406-406. 2020 Data Compression Conference (DCC), Snowbird, UT, USA.

Min Zhang et al., "PointHop: An Explainable Machine Learning Method for Point Cloud Classification", 2000, IEEE TMM.

Li Li et al., "Occupancy-Map-Based Rate Distortion Optimization for Video-Based Point Cloud Compression", 2019, ICIP.

Li Li et al., "Occupancy-map-based Rate Distortion Optimization and Partition for Video-based Point Cloud Compression", 2020, IEEE TCSVT.

Li Li et al., "Video-based compression for plenoptic point clouds", arXiv:1911.01355.

Li Li et al., "A-domain Perceptual Rate Control for 360-degree Video Compression", 2020, IEEE Journal on Selected Topics in Signal Processing.

Li Li et al., "Rate Control for Video-based Point Cloud Compression", 2020, IEEE TIP.

Li Li et al., "Efficient Projected Frame Padding for Video-based Point Cloud Compression", 2019, IEEE TMM.

Min Zhang et al., "Unsupervised Feedforward Feature (UFF) Learning for Point Cloud Classification and Segmentation", Dec. 1-4, 2020, 2020 IEEE International Conference on Visual Communications and Image Processing (VCIP), Macau.

Pranav Kadam et al., "Unsupervised Point Cloud Registration Via Salient Points Analysis (SPA)", Dec. 1-4, 2020, 2020 IEEE International Conference on Visual Communications and Image Processing (VCIP), Macau.

"Information technology—Coding of audio-visual objects—Part 12: ISO base media file format", Sep. 2022, ISO/IEC JTC 1/SC 29/WG 11.

"AVS3—Part 2: Video".

* cited by examiner

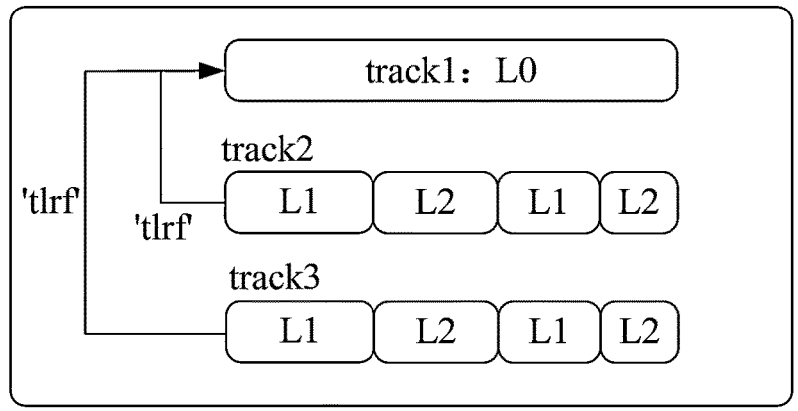

FIG. 6b

Determine a temporal domain layer of each media frame according to an inter-frame dependency relationship of each media frame in media data, so as to obtain the media frames of N temporal domain layers; N being a positive integer — S701

Encapsulate the media frames of the N temporal domain layers into M tracks respectively, and generate a description data box of a $j^{th}$ track according to an encapsulating process of the media frames; the description data box including temporal domain track indication information, the temporal domain track indication information being used for indicating a track encapsulating mode of the N temporal domain layers, the temporal domain track indication information including temporal domain layer information of the $j^{th}$ track, M and j being positive integers, and $j \leq M$ — S702

FIG. 7

MEDIA DATA PROCESSING METHOD AND RELATED DEVICE

RELATED APPLICATION(S)

This application is a continuation application of PCT Patent Application No. PCT/CN2022/083960 filed on Mar. 30, 2022, which claims priority to Chinese Patent Application No. 202110656768.4, filed with the China National Intellectual Property Administration on Jun. 11, 2021 and entitled "MEDIA DATA PROCESSING METHOD AND RELATED DEVICE", all of which are incorporated herein by reference in entirety.

FIELD OF THE TECHNOLOGY

The present disclosure relates to the technical field of computers, and particularly relates to media data processing.

BACKGROUND

In certain existing video coding technologies, a temporal domain layer partitioning technology is supported, and different temporal domain layers within a track are also indicated in a system layer encapsulating technology. However, these technologies may consider only the situation that one track is used for encapsulating a video bitstream.

SUMMARY

An embodiment of the present disclosure provides a media data processing method and related devices, aiming at improving the flexibility of encapsulating different temporal domain layers.

In one aspect, the present disclosure provides a method of processing media data. The media data includes multiple media frames, the multiple media frames are partitioned into N temporal domain layers and are encapsulated into M tracks, and M and N are positive integers greater than 1. The method includes: acquiring a description data box of a $j^{th}$ track in the M tracks, the description data box including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, j being a positive integer, and $j \leq M$; and decoding the media data according to the temporal domain track indication information.

In another aspect, the present disclosure provides a method of processing media data. The method includes: determining a temporal domain layer of each media frame according to an inter-frame dependency relationship of each media frame in the media data, to obtain the media frames of N temporal domain layers; N being a positive integer greater than 1; and encapsulating the media frames of the N temporal domain layers into M tracks respectively, and generating corresponding description data boxes; the description data box of a $j^{th}$ track in the M tracks including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, and M being a positive integer greater than 1.

In yet another aspect, the present disclosure provides an apparatus of processing media data. The media data includes multiple media frames, the multiple media frames are partitioned into N temporal domain layers and are encapsulated into M tracks, and M and N are positive integers greater than 1. The apparatus includes: a memory storing computer program instructions; and a processor coupled to the memory and configured to execute the computer program instructions and perform: acquiring a description data box of a $j^{th}$ track in the M tracks, the description data box including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, j being a positive integer, and $j \leq M$; and decoding the media data according to the temporal domain track indication information.

In yet another aspect, the present disclosure provides an apparatus of processing media data. The apparatus includes: a memory storing computer program instructions; and a processor coupled to the memory and configured to execute the computer program instructions and perform: determining a temporal domain layer of each media frame according to an inter-frame dependency relationship of each media frame in the media data, to obtain the media frames of N temporal domain layers; N being a positive integer greater than 1; and encapsulating the media frames of the N temporal domain layers into M tracks respectively, and generating corresponding description data boxes; the description data box of a $j^{th}$ track in the M tracks including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, and M being a positive integer greater than 1.

In yet another aspect, the present disclosure provides a computer-readable storage medium, storing a computer program, the computer program being configured to perform the media data processing method according to the aspect.

In the embodiments of the present disclosure, a content generation device is supported to encapsulate the media frames of the multi-temporal-domain layer to different tracks; and in the encapsulating process, the temporal domain track indication information is recorded in the description data box of each track, thus the tracks of different temporal domain layers are associated, the temporal domain layer information in the tracks is indicated, the base track is marked, and the strategy information of mutual combination of the tracks of the multi-temporal-domain layer is indicated. Therefore, a content consumption device can select a proper temporal domain layer according to the description data box in the track, and samples of different tracks are combined and are subjected to decoding presentation, thus the flexibility of multi-track encapsulation is ensured, and decoding computation resources are saved to the maximum extent.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 6b shows a schematic diagram of a multi-temporal-domain multi-track encapsulating mode according to certain embodiment(s) of the present disclosure;

FIG. 7 shows a schematic flowchart of a media data processing method according to certain embodiment(s) of the present disclosure;

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Figure 1:
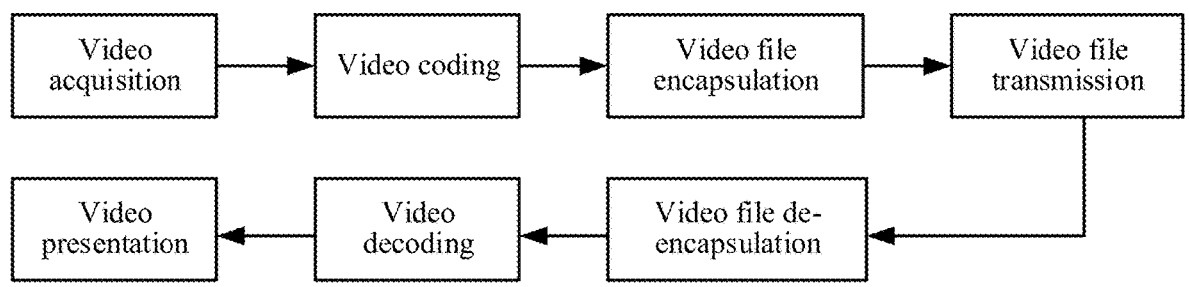
FIG. 1 shows a schematic flowchart of video processing according to certain embodiment(s) of the present disclosure.

Embodiments of the present disclosure relate to a media data processing technology. Media data (or referred to as multimedia data) refers to composite data formed by data of media such as texts, graphs, images, sounds, animations and moving images which are mutually associated in content. The media data mentioned in the embodiments of the present disclosure includes audio data formed by sounds and video data formed by images and sounds. In the embodiments of the present disclosure, the video data is taken as the media data for describing the data processing process of the media data in detail, and when or in response to a determination that the media data is the audio data, the embodiments of the present disclosure can be taken as a reference. The processing process of the media data involved in the embodiments of the present disclosure includes media data acquisition, media data coding, media data file encapsulation, media data file transmission, media data decoding and final data presentation. When or in response to a determination that the media data is video data, the processing process for the video data can be as shown in FIG. 1, including: video acquisition, video coding, video file encapsulation, video transmission, video file de-encapsulation, video decoding and final video presentation.

Figure 2:
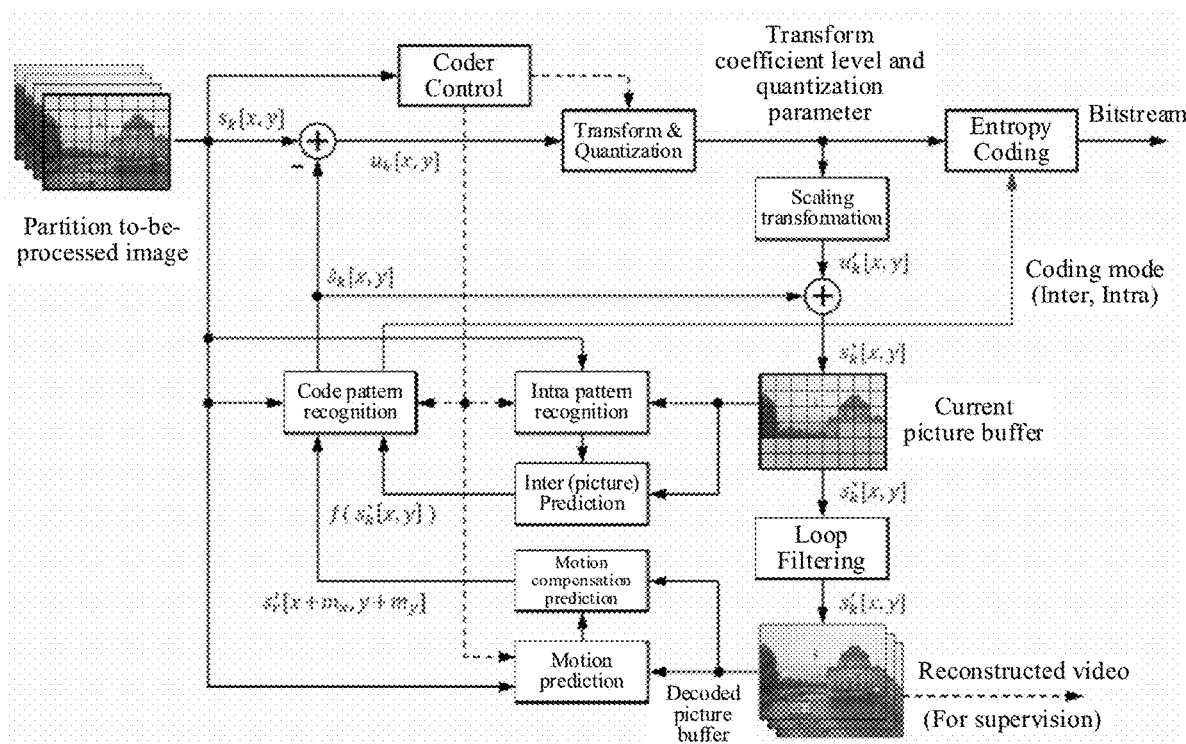
FIG. 2 shows a schematic flowchart of a method for processing media data according to certain embodiment(s) of the present disclosure.
Figure 3:
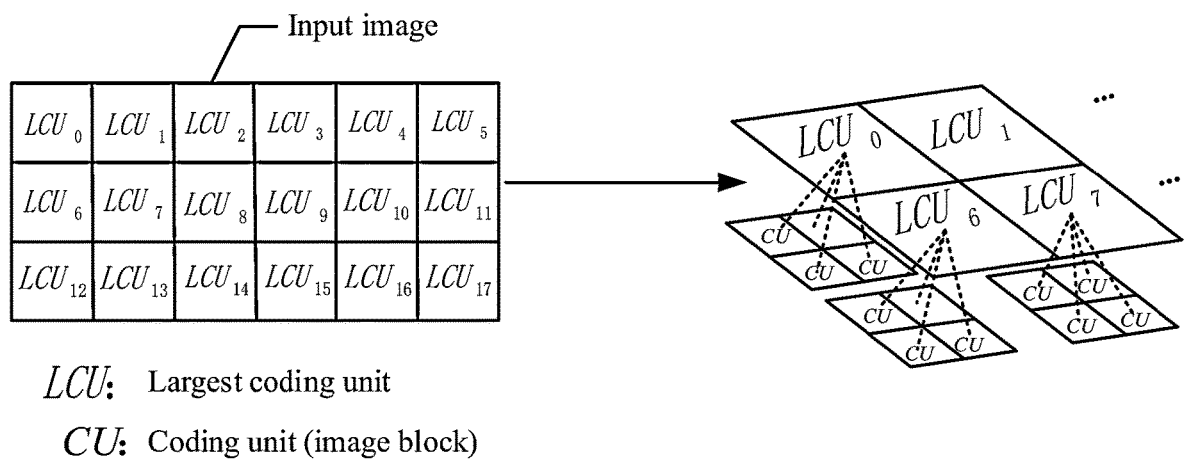
FIG. 3 shows a schematic diagram of a coding unit according to certain embodiment(s) of the present disclosure.

Video acquisition is used for converting an analog video into a digital video and storing the digital video in a format of a digital video file, that is, the video acquisition can be used for converting a video signal into binary digital information, where the binary information converted from the video signal is a binary data stream, and the binary information can also be referred to as a code stream or a bitstream of the video signal; and video coding is used for converting a file in an original video format into a file in another video format through a compression technology. The generation of the video media content in the embodiments of the present disclosure refers to a real scene generated by camera acquisition and a screen content scene generated by a computer; in view of an acquisition mode of a video signal, the video signal can be shot through a camera or generated by the computer; due to different statistical characteristics, corresponding compression coding modes of the video signal may also be different; and a modern mainstream video coding technology adopts a hybrid coding framework to carry out the following series of operations and processing on an inputted original video signal by taking an international video coding standard High Efficiency Video Coding (HEVC, international video coding standard HEVC/H.265), versatile video coding (VVC, international video coding standard VVC/H.266) and a Chinese national video coding standard audio video coding standard (AVS) or AVS3 (third-generation video coding standard derived from an AVS standard group) as examples, and the specific steps are shown in FIG. 2:

① Block partition structure: an input image (such as a media frame in video data) is partitioned into several non-overlapped processing units according to the size, and each processing unit is subjected to similar compression operation. This processing unit is referred to as a coding tree unit (CTU) or a largest coding unit (LCU). The coding tree unit is generally partitioned from the largest coding unit to the smallest coding unit; and the CTU can be continuously more finely partitioned to obtain one or more basic coding units, referred to as coding unit (CU). Each CU is the most basic element in a coding link. Various coding modes which may be adopted by each CU are described as follows, and the relationship between the LCU (or CTU) and the CU can be as shown in FIG. 3.

② Predictive coding: it includes Intra (picture) Prediction, Inter (picture) Prediction and the like; a residual video signal can be obtained after predicting the original video signal by a selected reconstructed video signal. It is desirable to select the most suitable mode from multiple possible predictive coding modes for the current CU and inform a decoding side through a coding side.

a. Intra (picture) Prediction: the predicted signal is from a coded and reconstructed region in the same image.

b. Inter (picture) Prediction: the predicted signal is from other coded images (referred to as reference images) different from the current image.

③ Transform & Quantization: the residual video signal is converted into a transform domain through transform operations such as discrete fourier transform (DFT) and discrete cosine transform (DCT, a subset of DFT), which is referred to as a transform coefficient. The signal in the transform domain is further subjected to lossy quantization operation, and certain information is lost, thus the quantized signal is beneficial to compression expression.

In some video coding standards, there may be more than one transform mode for selecting, and therefore, it is desirable to select one of the transforms for the current CU and inform the decoding side through the coding side. The fineness of quantization is generally determined by a quantization parameter (QP), when the value of the QP is relatively large, it indicates that the coefficients within a larger value range will be quantized into the same output, which always causes greater distortion and relatively lower bit rate; and on the contrary, when the value of the QP is relatively small, it indicates that the coefficients within a relatively small value range will be quantized into the same output, which always causes relatively small distortion and corresponds to relatively upper bit rate.

④ Entropy coding or statistical coding: the quantized transform domain signal is subjected to statistical compression coding according to the occurrence frequency of each value, and finally a binary (0 or 1) compressed code stream is outputted. Meanwhile, other information such as a selected mode and a motion vector generated by coding is also subjected to entropy coding to reduce the bit rate.

The statistical coding is a lossless coding mode, which can effectively reduce the bit rate desired for expressing the same signal. Common statistical coding modes include variable length coding (VLC) or content adaptive binary arithmetic coding (CABAC).

⑤ Loop Filtering: the coded image is subjected to operations of inverse quantization, inverse transformation and prediction compensation (inverse operations of ②-④) to obtain a reconstructed decoded image. Compared with an original image, the reconstructed image has part of information different from the original image due to the influence of quantization, and distortion is caused. The reconstructed image is subjected to filtering operation through deblocking, sample adaptive offset (SAO) or adaptive loop filter (ALF) and other filters, thus the distortion degree generated by quantization can be effectively reduced. These filtered reconstructed images are treated as a reference for subsequent coded images and are used for predicting a future signal, therefore, the filtering operation is also referred to as loop filtering and filtering operation in a coding loop.

FIG. 2 shows a basic flow of a video coder, and in FIG. 2, a $k^{th}$ CU (marked as $S_k[x, y]$) is taken as an example for description, where k is a positive integer greater than or equal to 1 but less than or equal to the number of CUs in an inputted current image; $S_k[x, y]$ represents a pixel with the coordinate [x, y] in the $k^{th}$ CU; x represents the horizontal coordinate of the pixel; y represents the longitudinal coordinate of the pixel; $S_k[x, y]$ is subjected to optimal processing in motion compensation or intra (picture) prediction and the like to obtain a prediction signal $\widehat{S_k}[x, y]$; $S_k[x, y]$ is subtracted from $\widehat{S_k}[x, y]$ to obtain a residual signal $U_k[x, y]$; the residual signal $U_k[x, y]$ is subjected to transform and quantization; the quantized output data is processed by two different modes: one mode is to transmit the data to an entropy coder for entropy coding, and output the coded code stream to a buffer for storage and wait for transmission; and the other mode is to perform inverse quantization and inverse transformation to obtain a signal $U'_k[x, y]$. The signal $U'_k[x, y]$ and $\widehat{S_k}[x, y]$ are added to obtain a new prediction signal $S^*_k[x, y]$, and $S^*_k[x, y]$ is transmitted to the buffer of the current image for storage. $S^*_k[x, y]$ is subjected to intra (picture)-image prediction to obtain $f(S^*_k[x, y])$; $S^*_k[x, y]$ is subjected to loop filtering to obtain $S'_k[x, y]$; and $S'_k[x, y]$ is transmitted to a buffer of the decoded image for storage, to generate the reconstructed video. $S'_k[x, y]$ is subjected to motion-compensation prediction to obtain $S'_r[x+m_x, y+m_y]$, where $S'_r[x+m_x, y+m_y]$ represents a reference block, and $m_x$ and $m_y$ represent horizontal and vertical components of a motion vector respectively.

After the media data is coded, it is desirable to encapsulate the coded data stream and transmit to a user; the video file encapsulation is to store the coded and compressed videos and audios in a file according to a certain format in accordance with an encapsulating format (or a container or a file container); common encapsulating format includes an audio video interleaved format (AVI) or an ISO based media file format (ISOBMFF, a media file format based on an international standard organization (ISO) standard), where the ISOBMFF is an encapsulating standard of the media file, and the most typical ISOBMFF file is a moving picture experts group 4 (MP4) file, and the main improvement of this embodiment of the present disclosure also focuses on an ISOBMFF data box. In one embodiment, the audio code stream and the video code stream are encapsulated in the file container according to the file format such as the ISOBMFF to form an encapsulated file; and in the encapsulated file, a sample is treated as the encapsulating unit in the file encapsulating process, and one encapsulated file is composed of multiple samples. That is, in the encapsulating process of the media file, one media frame is usually treated as one sample for encapsulating, thus generating the encapsulated file; when or in response to a determination that the media data is video media, the media frame is a media frame, and when or in response to a determination that the media data is the audio media, the media frame is an audio frame, namely, the encapsulated file for the video media includes multiple media frames, and the encapsulated file for the audio media includes multiple audio frames; and in this embodiment of the present disclosure, the media data is treated as the video media, and one sample in the encapsulated file is treated as one media frame in the video media for description.

The encapsulated file is transmitted to a user terminal in a video form, and the user terminal can present the final video content after performing inverse operations such as de-encapsulation and decoding. The encapsulated file can be transmitted to the user terminal through a transmission protocol, and the transmission protocol, for example, can be dynamic adaptive streaming over HTTP (DASH, an adaptive bit rate stream technology); when transmitting through DASH, high-quality streaming media can be delivered by HTTP network servers through the Internet, and in the DASH, media segment information is described by using media presentation description (MPD, media presentation description signaling in DASH); and in the DASH, a combination of one or more media components, such as a video file with a certain resolution, can be regarded as a Representation, multiple contained Representations can be regarded as an Adaptation Set (a set of video streams), and one DASH can contain one or more Adaptation Sets.

It is to be understood that the file de-encapsulation process of the user terminal is inverse to the file encapsulation process, and the user terminal can de-encapsulate the encapsulated file according to the file format desirables in encapsulating to obtain an audio code stream and a video code stream. The decoding process of the user terminal is also inverse to the coding process, and the user terminal can decode the audio code stream to restore audio content. According to the coding process, the decoder acquires the compressed code stream of each CU at the decoding side, and performs entropy decoding to obtain various kinds of mode information and quantized transformation coefficients. All the coefficients are subjected to inverse quantization and inverse transformation to obtain residual signals. On the other hand, prediction signals corresponding to the CU can be obtained according to the known coding mode information, and after the residual signals and the prediction signals are added, reconstruction signals can be obtained. Finally, a reconstruction value of the decoded image may be subjected to loop filtering to generate final output signals.

Figure 4:
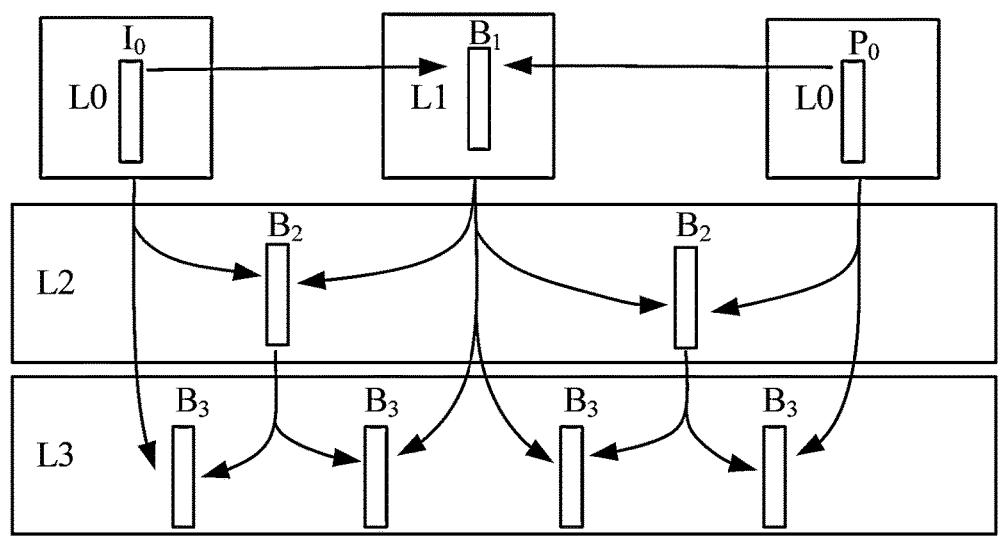
FIG. 4 shows a schematic diagram of partitioning of a temporal domain layer according to certain embodiment(s) of the present disclosure.

The video coding technology also involves a temporal domain layering technology which can partition different media frames into different temporal domain layers according to the dependency relationship in decoding; the media frames partitioned into lower layers through the temporal domain layering technology during temporal domain layer partitioning can be decoded without referring to the media frames of upper layers; as shown in FIG. 4, arrows represent the dependency relationship in decoding; and the arrow from an $I_0$ frame to a $B_1$ frame represents that the $B_1$ frame may be decoded by referring to the $I_0$ frame, that is, the decoding of the $B_1$ frame may depend on the decoding of the $I_0$ frame, and the relationships among the remaining frames can be determined in the same manner. It can be known from the inter-frame dependency relationship indicated by the arrows in FIG. 4 that all the media frames are partitioned into four temporal domain layers of L0-L3 according to the inter-frame dependency relationship, and the media frames of each temporal domain layer do not depend on the media frames of the upper layers during decoding. The lower and upper temporal domain layers mentioned in this embodiment of the present disclosure are relative concepts, such as for the four temporal domain layers L0-L3 in FIG. 4, L1-L3 are upper temporal domain layers for the L0 temporal domain layer, and for the L1 temporal domain layer, the L3 temporal domain layer is the upper temporal domain layer of L1, and the L0 temporal domain layer is the lower temporal domain layer of L1.

As shown in FIG. 4, the types of media frames include an I frame (Intra Slice), a B frame and a P frame. The I frame is also referred to as a key frame, belongs to intra-frame compression, and may refer to the information of the I frame itself during decoding; the B frame is a bidirectional predictive coding frame, and may refer to both a previous existing frame and a subsequent to-be-decoded frame during decoding; the P frame is a forward predictive coding frame, namely the P frame may refer to the information of a previous related frame during decoding; and Arabic numeral subscripts added for the I frame, the B frame and the P frame in FIG. 4 are used for representing related corresponding temporal domain layers. It is to be understood that based on the characteristics of the three types of media frames of the I frame, the P frame and the B frame in decoding, since the media frame of the lower temporal domain layer in the media frames of all the temporal domain layers does not depend on the upper temporal domain layer during decoding after temporal domain layer partitioning, it can be understood that the media frame in the lowest temporal domain layer (such as the L0 temporal domain layer) does not depend on any other temporal domain layer during decoding, namely the media frame of the lowest temporal domain layer can be independently decoded and displayed, and therefore, the media frame partitioned to the lowest temporal domain layer inevitably includes the I frame.

When performing temporal domain layer partitioning on the media frames, the media frames of the lower temporal domain layer do not need to refer to the media frame of the upper temporal domain layer during decoding, as shown in FIG. 4, it is assumed that one media frame in the video data includes four temporal domain layers of L0-L3, and the arrows in FIG. 4 represent the dependency relationships of the media frames in decoding, that is, the arrow from the $I_0$ frame to the $B_1$ frame represents that the $B_1$ frame at the L1 temporal domain layer may refer to the $I_0$ frame at the L0 temporal domain layer during decoding, the $B_1$ frame at the L1 temporal domain layer may refer to a $P_0$ frame at the L0 temporal domain layer during decoding, a first $B_2$ frame at the L2 temporal domain layer may refer to the $I_0$ frame at the L0 temporal domain layer and the $B_1$ frame at the L1 temporal domain layer during decoding, a second $B_2$ frame at the L2 temporal domain layer may refer to the $B_1$ frame at the L1 temporal domain layer and the $P_0$ frame at the L0 temporal domain layer during decoding, a first $B_3$ frame at the L3 temporal domain layer may refer to the first $B_2$ frame at the L2 temporal domain layer and the $I_0$ frame at the L0 temporal domain layer during decoding, a second $B_3$ frame at the L3 temporal domain layer may refer to the first $B_2$ frame at the L2 temporal domain layer and the $B_1$ frame at the L1 temporal domain layer during decoding, a third $B_3$ frame at the L3 temporal domain layer may refer to the $B_1$ frame at the L1 temporal domain layer and the second $B_2$ frame at the L2 temporal domain layer during decoding, and a fourth $B_3$ frame at the L3 temporal domain layer may refer to the second $B_2$ frame at the L2 temporal domain layer and the $P_0$ frame at the L0 temporal domain layer during decoding.

The existing AVS3 video coding technology may support the temporal domain layer partitioning technology (or referred to as temporal domain layering technology), and meanwhile, in the AVS3 system layer encapsulating technology, different temporal domain layers in the track are indicated; when encapsulating the media frames by the existing technology supporting temporal domain layering, the number of the temporal domain layers in the video code stream corresponding to the track for encapsulating each media frame can be indicated through a temporal domain layer number field (temporal_layer_num) in the encapsulated file; and in addition, the temporal domain layer of each media frame in the video code stream corresponding to the track for encapsulating a target media frame will be indicated through a temporal domain layer identification field (temporal_layer_id). The track refers to a series of samples with time attributes and in accordance with the ISO basic media file format (ISOBMFF) encapsulating mode, such as a video track, and the video track is obtained by encapsulating a code stream generated after each frame is coded by the video coder according to the ISOBMFF specification.

The existing AVS3 decoder configuration information (namely a description data box) record provides decoder configuration information for the AVS3 coding mode, the decoding configuration information can be represented by configuration information 1, and the configuration information 1 is as follows:

```
class Avs3DecoderConfigurationRecord{//AVS3 Decoder configuration
record
    unsigned int(8) configurationVersion; //Configuration version field for
8-bit unsigned integer
    unsigned int(8) profile_id; //Profile identifier
    unsigned int(8) level_id; //Level identifier
    bit(6) reserved = '111111'b; //Reserved fields, general fields desire an
integer number of bytes, so it may be supplemented with reserved bits
    unsigned int(2) chroma_format; //Chroma format
    bit(5) reserved = '11111'b; //
    unsigned int(3) encoding_precision; //Encoding precision
    bit(4) reserved = '1111'b; //
    unsigned int(4) frame_rate_code; //Encoding frame rate
    bit(6) reserved = '111111'b; //
    unsigned int(2) library_indication; //Library indication
    bit(4) reserved = '11111'b; //
    unsigned int(3) temporal_layer_num; //Temporal domain layer number
field
}
```

In view of the above, although the temporal domain layer partitioning technology is supported in the AVS3 video coding technology, different temporal domain layers in the track are indicated in the AVS3 system layer encapsulating technology. However, in certain existing system layer encapsulating technologies, only the situation that one track is used for encapsulating a video bitstream is considered. If a user encapsulates a video bitstream containing different temporal domain layers into multiple video file tracks, it is difficult to provide enough information in certain existing technologies to support the user to selectively reconstruct the video bitstream through different file tracks and consume it.

From this, the media data processing method provided by this embodiment of the present disclosure may support multi-track file encapsulation of the temporal domain layer partitioning technology in AVS3 coding. When or in response to a determination that the media data is video data, the specific implementation steps are as follows:

1. in a video coding link, determine, by a content generation device, temporal domain layers for different media frames according to an inter-frame dependency relationship among the media frames of the video data;

2. according to the temporal domain layers of the media frames, encapsulate a video bitstream into multiple different tracks, and indicate specific temporal domain layer information contained in each track in each file track, including temporal domain layer id, a frame rate corresponding to the temporal domain layer, bit rate information and the like;

3. identify a track containing the lowest temporal domain layer as a base track, and refer tracks of the remaining upper temporal domain layers to the base track through a "tlrf" reference; meanwhile, provide strategy information of mutual combination of multiple temporal domain layers during the file encapsulation of the base track; and 4. on a user consumption side, select, by a content consumption device where the user is located, one or more tracks corresponding to the temporal domain layers according to the device capability and the strategy information of mutual combination of multiple temporal domain layers, and de-encapsulate these different tracks and reconstruct the tracks into a bitstream for decoding. Finally, the purposes of flexibly selecting the file tracks and saving decoding computation resources are achieved.

To support the steps, this embodiment of the present disclosure adds several descriptive fields at the system layer, and by taking a form of extending the existing ISOBMFF data box as an example, relevant fields are defined to support the multi-track file encapsulating technology of AVS3 temporal domain layer partitioning. The media data processing method provided by this embodiment of the present disclosure is described in detail in combination with FIG. 5. The media data processing method can be executed by any content consumption device performing media content consumption; and it is to be understood that the content consumption device includes a terminal device (or a server) where the user performing the media content consumption is located. The media data includes multiple media frames, the multiple media frames are partitioned into N temporal domain layers and are encapsulated into M tracks, and M and N are both positive integers greater than 1.

Figure 5:
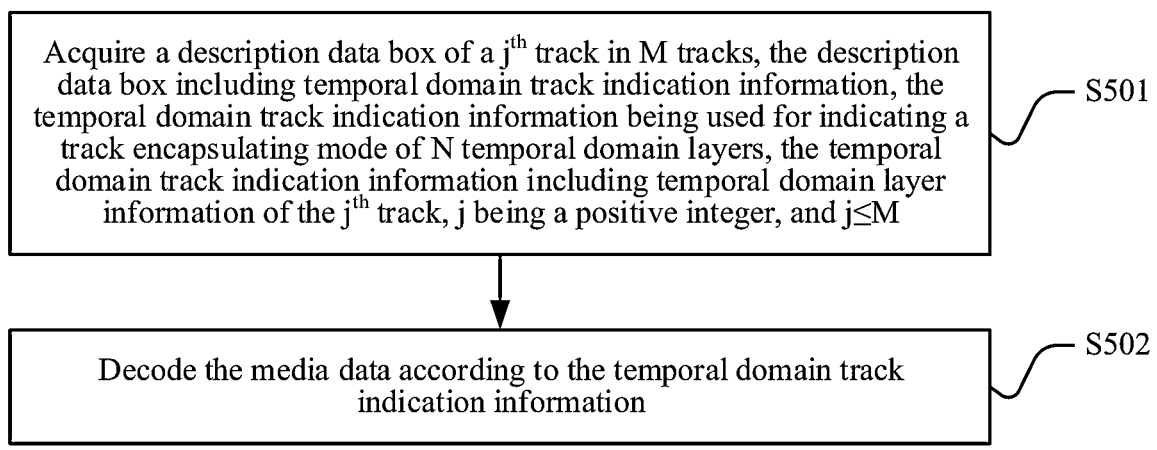
FIG. 5 shows a schematic flowchart of a media data processing method according to certain embodiment(s) of the present disclosure.

As shown in FIG. 5, the method includes:

S501. Acquire a description data box of a $j^{th}$ track in M tracks, the description data box including temporal domain track indication information.

The temporal domain track indication information is used for indicating a track encapsulating mode of N temporal domain layers, and the temporal domain track indication information includes temporal domain layer information of a temporal domain layer encapsulated into the $j^{th}$ track, j is a positive integer, and j≤M.

Firstly, the description data box acquired by a content consumption device is generated based on the coding and encapsulating of the media data by a content generation device; during encapsulating the media data, the content generation device is capable of encapsulating the media frames of different temporal domain layers into multiple different tracks based on the temporal domain layer of each media frame. The media data includes multiple media frames, the multiple media frames are partitioned into N temporal domain layers; and therefore, the multiple media frames can be encapsulated into M tracks, and M and N are both positive integers. The M tracks for encapsulating the multiple media frames can be partitioned into base tracks and non-base tracks according to the characteristics of the media frames encapsulated in the tracks in decoding. The base tracks mean that the media frames encapsulated in the tracks can be independently decoded, that is, the media frames encapsulated in the base tracks do not refer to the media frames in any other tracks during decoding; it is to be understood that when or in response to a determination that the media data is video data, the media frames encapsulated in the base tracks inevitably include an I frame; and the media frames partitioned to the lowest temporal domain layer inevitably include the I frame, namely, the temporal domain layer encapsulated in the base tracks inevitably includes the lowest temporal domain layer.

That is, when or in response to a determination that the media data is video data, when the content generation device may transmit the video data to the user side for consumption display, the temporal domain layer can be determined for different media frames according to the inter-frame dependency relationship of the media frames during video coding at first, the video bitstream can be encapsulated into multiple different tracks according to the temporal domain layer, and specific temporal domain layer information can be indicated in each file track through the description data box; correspondingly, when consuming at the user side, the temporal domain layer can be selected based on the decoding capability of the related terminal device, and thus the decoding computation resources can be saved. In one embodiment, if the multiple media frames included in one piece of media data belong to N temporal domain layers respectively, the content generation device will generate corresponding description data boxes in each track after encapsulating the media frames of the N temporal domain layers to one or more tracks, so that the content consumption device (such as the terminal device at the user side) can determine the encapsulating mode of the content generation device for the media frames of the N temporal domain layers based on records of the description data box and further selects the media frames of the proper temporal domain layers for decoding presentation.

In this embodiment of the present disclosure, the description data box refers to a multi-track file encapsulating technology which supports VAS3 temporal domain layer partitioning by adding temporal domain track information into the existing ISOBMFF data box. It is to be understood that adding the temporal domain track information into the ISOBMFF data box includes expanding one or more added related fields into the ISOBMFF data box. In this embodiment of the present disclosure, the description data box of the $j^{th}$ track in the M tracks is taken as an example to describe the related fields expanded in the description data box in detail. The related fields expanded in the description data box can be shown as configuration information 2, and the configuration information 2 is as follows:

```
class Avs3DecoderConfigurationRecord{
  ...
  unsigned bit(1) multi_temporal_track_flag;
  if(temporal_layer_num > 1||multi_temporal_track_flag == 1){
    TemporalLayerInfoBox(temporal_layer_num,
    multi_temporal_track_flag);
  }
}
class TemporalLayerInfoBox extends FullBox('tlit',
  temporal_layer_num,
  multi_temporal_track_flag) {
  for(i=0; i<temporal_layer_num; i++){
    unsigned int(8) temporal_layer_id[i];
  }
  if(multi_temporal_track_flag == 1){
    unsigned int(1) base_track_flag;
    bit(7) reserved;
    if(base_track_flag == 1){
      unsigned int(8) total_temporal_layer_num;
      for(i=0; i< total_temporal_layer_num; i++){
        unsigned int(3) temporal_layer_id[i];
        unsigned int(4) frame_rate_code[i];
        unsigned int(18) temporal_bit_rate_lower[i];
        unsigned int(12) temporal_bit_rate_upper[i];
        bit(3) reserved;
      }
      unsigned int(8) total_temporal_track_num;
      for(i=0; i< total_temporal_track_num; i++){
        unsigned int(32) track_ID [i];
        unsigned int(1) is_output_track_flag[i];
        unsigned int(1) is_alternative _track_flag [i];
        if(is_alternative_track_flag [i]){
          unsigned int(32) alternate_track_ID;
        }
        bit(6) reserved;
      }
    }
  }
  else{
    for(i=0; i< temporal_layer_num; i++){
      unsigned int(3) temporal_layer_id[i];
      unsigned int(4) frame_rate_code[i];
      unsigned int(18) temporal_bit_rate_lower[i];
      unsigned int(12) temporal_bit_rate_upper[i];
      bit(3) reserved;
```

-continued

```
    }
  }
}
```

The fields in the temporal domain track indication information included in the description data box are respectively a multi-temporal-domain track identification field (multi_temporal_track_flag), a total temporal domain layer number field (total_temporal_layer_num), a temporal domain layer number field, a temporal domain layer identification field (temporal_layer_id[i]), a frame rate field (frame_rate_code[i]), a lower bit rate field (temporal_bit_rate_lower[i]), an upper bit rate field (temporal_bit_rate_upper[i]), a base track identification field (base_track_flag), a track identification field (track_ID [i]), a priority decoding presentation field (is_output_track_flag[i]), an alternative track field (is_alternative_track_flag [i]) and an alternative track identification field (alternate_track_ID) in the configuration information 2. The temporal domain layer number field (temporal_layer_id[i]), the frame rate field (frame_rate_code[i]), the lower bit rate field (temporal_bit_rate_lower[i]) and the upper bit rate field (temporal_bit_rate_upper[i]) in the fields are used for indicating specific temporal domain layer information in the corresponding track (such as the $j^{th}$ track).

The semantics and grammar involved in the configuration information 2 will be described in detail as follows:

(1) The multi-temporal-domain track identification field (multi_temporal_track_flag) is used for indicating the track encapsulating modes of N temporal domain layers of the media data; and the track encapsulating modes include: a multi-track encapsulating mode and a single-track encapsulating mode; when or in response to a determination that the multi-temporal-domain track identification field is a first numerical value, the multi-temporal-domain track identification field is used for indicating that the multiple media frames of the N temporal domain layers are encapsulated into multiple different tracks; and when or in response to a determination that the multi-temporal-domain track identification field is a second numerical value, the multi-temporal-domain track identification field is used for indicating that the multiple media frames of the N temporal domain layers are encapsulated into a single track; and the first numerical value may be 1, and the second numerical value may be 0.

(2) The temporal domain layer number field (temporal_layer_num) is used for indicating the number of temporal layers in a current track (the $j^{th}$ track). As shown in the configuration information 2, when the value of the temporal domain layer number field is greater than 1, namely the multiple temporal domain layers with the number of the value of the temporal domain layer number field are encapsulated in the $j^{th}$ track, or when the value of the multi-temporal-domain track identification field is 1, namely one temporal domain layer of the media data is encapsulated into the $j^{th}$ track, the content consumption device is capable of further reading the value of the related field from the description data box during decoding, thus achieving decoding presentation according to the value of each related field, where the description data box is a "tlin" type data box.

(3) The description data box in the $j^{th}$ track includes specific temporal domain layer information of the $j^{th}$ track; the temporal domain layer information includes a temporal domain layer identification field (temporal_layer_id[i]), and the temporal domain layer identification field is used for indicating an identity document (ID, a unique identity) of a single temporal domain layer. One temporal domain layer in the N temporal domain layers corresponds to one temporal_layer_id, that is, the temporal domain layer identification field can be used for indicating a layer identification of an $i^{th}$ temporal domain layer in the temporal domain layers encapsulated into the $j^{th}$ track. According to the configuration information 2, the layer identification of the $i^{th}$ temporal domain layer in the temporal domain layers encapsulated into the $j^{th}$ track is recorded in the temporal_layer_id[i] in the description data box of the $j^{th}$ track.

In addition, the temporal domain layer information in the $j^{th}$ track further includes the frame rate field (frame_rate_code[i]) and the bit rate. The frame rate field is used for indicating a frame rate accumulated to the media frame of the $i^{th}$ temporal domain layer (namely, the temporal domain layer is equal to temporal_layer_id[i]), and the bit rate information is used for indicating a bit rate accumulated to the media frame of the $i^{th}$ temporal domain layer (namely, the temporal domain layer is equal to temporal_layer_id[i]); the bit rate information includes the lower bit rate field (temporal_bit_rate_lower[i]) which is used for indicating lower 18 bits of the bit rate accumulated to the media frame of the $i^{th}$ temporal domain layer; and moreover, the bit rate information further includes the upper bit rate field (temporal_bit_rate_upper[i]) which is used for indicating upper 12 bits of the bit rate accumulated to the media frame of the $i^{th}$ temporal domain layer. The accumulation refers to that it is assumed that temporal_layer_id[i]=3, and for temporal_layer_id[i]=3, the corresponding frame rate (and bit rate) is the frame rate (and bit rate) of all frames with the temporal_layer_id[i] being smaller than 3.

As shown in the configuration information 2, if the value of the multi-temporal-domain track identification field in the description data box is 0, namely, the multiple media frames of the N temporal domain layers in the media data are encapsulated into the single track, the content consumption device is capable of determining the corresponding frame rate and bit rate accumulated to each temporal domain layer by reading values in the temporal domain layer identification field, the frame rate field, the lower bit rate field and the upper bit rate field, thus the content consumption device can select the media frames of part or all of the temporal domain layers in combination with the own decoding performance to perform decoding presentation.

(4) When the value of the multi-temporal-domain track identification field is 1, it indicates that the multiple media frames of the N temporal domain layers in the media data are encapsulated into multiple different tracks; under the condition that the multiple media frames of the N temporal domain layers are encapsulated into the multiple different tracks, the content consumption device is capable of reading values of other fields before reading the values of the frame rate field, the lower bit rate field and the upper bit rate field to determine the corresponding frame rate and the bit rate accumulated to each temporal domain layer, and the fields to be read by the content consumption device include part or all of the fields mentioned in the following ①-④):

① Base track identification field (base_track_flag) in the temporal domain track indication information.

The base track identification field is used for indicating whether the $j^{th}$ track is a base track or not; when or in response to a determination that the base track identification field is a first numerical value, the base track identification field is used for indicating that the $j^{th}$ track is the base track; when or in response to a determination that the base track identification field is a second numerical value, the base track identification field is used for indicating that the $j^{th}$ track is a non-base track; and the media frames encapsulated in the base track are independently decoded, where the first numerical value may be 1, and the second numerical value may be 0. According to the configuration information 2, when the content generation device performs multi-track encapsulation on the media frames of the N temporal domain layers, the frame rates and bit rates accumulated to the media frames of the temporal domain layers are recorded in the base track, namely, values of the frame rate field, the lower bit rate field and the upper bit rate field only exist in the description data box of the base track, and the frame rate field, the lower bit rate field and the upper bit rate field are null in the description data box of the non-base track.

In one embodiment, the value, read from the description data box of the $j^{th}$ track by the content consumption device, of the base track identification field is 1, which indicates that the $j^{th}$ track is the base track; furthermore, the content consumption device is further capable of reading the values of the frame rate field, the lower bit rate field and the upper bit rate field from the description data box of the $j^{th}$ track, thus determining the corresponding frame rate and bit rate accumulated to each temporal domain layer.

② Total temporal domain layer number field (total_temporal_layer_num).

The total temporal domain layer number field is used for indicating the total temporal domain layer number corresponding to all tracks in a current file, namely indicating the total number of the temporal domain layers encapsulated into the M tracks. When the multi-track encapsulation mode is adopted for multiple temporal domain layers, and when or in response to a determination that the $j^{th}$ track is the base track, the content generation device is capable of recording an identification of each temporal domain layer in the description data box of the base track based on the total temporal domain layer number field during determining the value of the temporal domain layer identification field (temporal_layer_id[i]) in the description data box of the base track.

③ Reference type identification field ("tlrf").

The reference type identification field is used for defining a reference relationship between the base track (or a base temporal domain layer track) and the non-base track (or an upper temporal domain layer track) when the multi-track encapsulation is used in the multi-temporal-domain layer. The base temporal domain layer track is a track containing the lowest temporal domain layer ID, only one base temporal domain layer track exists in one file, and the remaining tracks containing all temporal domain layers are tracks of the upper temporal domain layer.

The upper temporal domain layer track will be referred to the base temporal domain layer track depended by decoding through the track reference box. Corresponding track reference type boxes will be added to the track reference box of the upper temporal domain layer track, where a current base track (or referred to as base temporal domain layer track) is indicated in the track reference type boxes through track_IDs; and the reference between the non-base track and the base track is identified through the corresponding reference type identification fields (reference_type) in the track reference type boxes, and this type of field is defined as:

"tlrf": a referred track is the base temporal domain layer track.

That is, when or in response to a determination that the value, read from the description data box of the $j^{th}$ track by the content consumption device, of the base track identification field is 0, it indicates that the $j^{th}$ track is the non-base track; if the $j^{th}$ track is the non-base track, the $j^{th}$ track further includes the track reference box, and the track reference box includes the track reference type boxes; the track reference type boxes include the track identification field and the reference type identification field; and the track identification field is used for storing an identification of the base track, and the reference type identification field is used for indicating that the referred track is the base track. It is to be understood that if the $j^{th}$ track is the non-base track, since the values of the frame rate field, the lower bit rate field and the upper bit rate field are all null in the description data box of the non-base track, the content consumption device cannot read the values of the frame rate field, the lower bit rate field and the upper bit rate field through the description data box of the $j^{th}$ track under the condition that the $j^{th}$ track is the non-base track, and consequently, the frame rate and the bit rate accumulated to each temporal domain layer cannot be determined; and the content consumption device is capable of referring from the non-base track (namely, the $j^{th}$ track) to the base track through the reference type identification field in the track reference type boxes in the track reference box of the $j^{th}$ track, and reading the values of the frame rate field, the lower bit rate field and the upper bit rate field in the base track.

④ The temporal domain track indication information includes track combination strategy information, and the track combination strategy information includes a track identification field (track_ID [i]), a priority decoding presentation field (is_output_track_flag[i]), an alternative track field (is_alternative_track_flag [i]) and an alternative track identification field (alternate_track_ID).

The track identification field is used for indicating an identification (ID) of the track containing a part of the temporal domain layer, and one track in the M tracks corresponds to one track_ID.

The priority decoding presentation field is used for indicating whether the $j^{th}$ track (namely, the current track) is a track subjected to priority decoding presentation or not; when or in response to a determination that the priority decoding presentation field is a first numerical value, the priority decoding presentation field is used for indicating that the $j^{th}$ track is the track subjected to priority decoding presentation; when or in response to a determination that the priority decoding presentation field is a second numerical value, the priority decoding presentation field is used for indicating that the $j^{th}$ track is not the track subjected to priority decoding presentation; and the first numerical value may be 1, and the second numerical value may be 0.

The alternative track field is used for indicating whether the $j^{th}$ track (namely, the current track) is an alternative track of one track in the M tracks or not; when or in response to a determination that the alternative track field is a first numerical value, the alternative track field is used for indicating that the $j^{th}$ track is the alternative track of one track in the M tracks; when or in response to a determination that the alternative track field is a second numerical value, the alternative track field is used for indicating that the $j^{th}$ track is not the alternative track; and the first numerical value may be 1, and the second numerical value may be 0.

The alternative track identification field is used for indicating an identification of one track alternated by the $j^{th}$ track (namely, the current track).

In combination with the description of grammar and semantics in the configuration information 2, when or in response to a determination that the multiple media frames in the media data are of N different temporal domain layers, the content generation device is capable of encapsulating the multiple media frames in the media data in the following two situations:

In the first situation, the media frames of the N temporal domain layers can be encapsulated into a single track. Thus, after acquiring the encapsulated file for the media data, the content consumption device is capable of determining the layer identification of the $i^{th}$ temporal domain layer in the N temporal domain layers and corresponding frame rate and bit rate by reading the layer identification field, the frame rate field, the lower bit rate field and the upper bit rate field from the description data box of the single track for encapsulating the media frames respectively of the N temporal domain layers, and the content consumption device is capable of selecting part or all of the media frames of the temporal domain layers for decoding in combination with own decoding capability, namely, S502 can be performed.

In the second situation, the media frames of the N temporal domain layers can be encapsulated into multiple different tracks; when the content generation device encapsulates the media frames in a multi-track encapsulating mode, a strategy of mutually combining the temporal domain layers encapsulated in the tracks and the frame rate and bit rate accumulated to the corresponding media frames of the temporal domain layers are recorded in the base track, and other tracks are referred into the base track through the reference type identification field, and thus the content consumption device is capable of selecting part or all of the media frames for decoding in combination with own decoding capability through related information recorded in the base track, namely, S502 can be performed.

S502. Decode the media data according to the temporal domain track indication information.

After acquiring the description data box in the $j^{th}$ track, the content consumption device is capable of decoding the media data according to the temporal domain track indication information in the description data box; and the content consumption device is capable of reserving the temporal domain layer matched with decoding performance of a decoding device in the N temporal domain layers according to the temporal domain track indication information and the decoding performance of the decoding device, and decoding and presenting the media frames of the reserved temporal domain layer. When the content consumption device reserves the temporal domain layer matched with the decoding performance in the N temporal domain layers according to the temporal domain track indication information and the decoding performance of the decoding device, in one implementation, due to that the temporal domain track indication information includes the multi-temporal-domain track identification field, the temporal domain layer identification field, the frame rate field and the bit rate information, and the bit rate information includes the lower bit rate field and the upper bit rate field, the content consumption device is capable of reading the value of the multi-temporal-domain track identification field in the temporal domain track indication information; when or in response to a determination that the read multi-temporal-domain track identification field is the second numerical value, it indicates that the media frames of the N temporal domain layers are encapsulated into the single track, and the value of the temporal domain layer identification field, the value of the frame rate field, as well as the value of the lower bit rate field and the value of the upper bit rate field in the bit rate information are read; and therefore, the content consumption device is capable of reserving the temporal domain layer matched with the decoding performance in the N temporal domain layers according to the value of the temporal domain layer identification field, the value of the frame rate field, as well as the value of the lower bit rate field and the value of the upper bit rate field in the bit rate information, and the decoding performance of the decoding device (namely, the content consumption device).

If the media data is video data, after encapsulating the media frames of the video data (or video content) of the N temporal domain layers into a single track, the content consumption device performs decoding consumption according to the following specific process:

the content generation device codes and encapsulates the video content A; it is assumed that the video content A has 3 temporal domain layers L0-L2, media frames of any temporal domain layer in the three temporal domain layers are encapsulated into one track, and when accumulating to each temporal domain layer, the corresponding frame rate and bit rate are as follows:

L0:20 fps, bitrate=1 mbps;
L1:30 fps, bitrate=1.5 mbps;
L2:60 fps, bitrate=3 mbps.

The content generation device is capable of transmitting the video file A to a user 1 and a user 2 according to the request of the content consumption device, the user 1 and the user 2 respectively receive the corresponding file A, and perform decoding consumption according to frame rate and bit rate information corresponding to each temporal domain layer in the track. In certain embodiment(s):

the decoding device of the content consumption device where the user 1 is located is good in performance, all media frames of L0 to L2 are selected to be reserved for decoding presentation, and thus an optimal watching effect is obtained; however, the decoding device of the content consumption device where the user 2 is located is poor in performance, all media frames of L0 are selected to be reserved, the media frames of L1 and L2 can be discarded, and only the reserved media frames of L0 are decoded for presentation.

When the content consumption device reserves the temporal domain layer matched with the decoding performance in the N temporal domain layers according to the temporal domain track indication information and the decoding performance of the decoding device, in another implementation, if the content consumption device can read the value of the multi-temporal-domain track identification field in the temporal domain track indication information, and the multi-temporal-domain track identification field read by the content consumption device is the first numerical value, the media frames of the N temporal domain layers are encapsulated to multiple different tracks; and if the temporal domain layers in the tracks are not overlapped, the content consumption device is capable of reading the value of the temporal domain layer identification field, the value of the frame rate field, as well as the value of the lower bit rate field and the value of the upper bit rate field in the bit rate information from the base track; the media frames encapsulated in the base track are independently decoded; and part or all of the temporal domain layers in the tracks matched with the decoding performance are reserved according to the value of the temporal domain layer identification field, the value of the frame rate field, as well as the value of the lower bit rate field and the value of the upper bit rate field in the bit rate information, and the decoding performance of the decoding device.

Figure 6A:
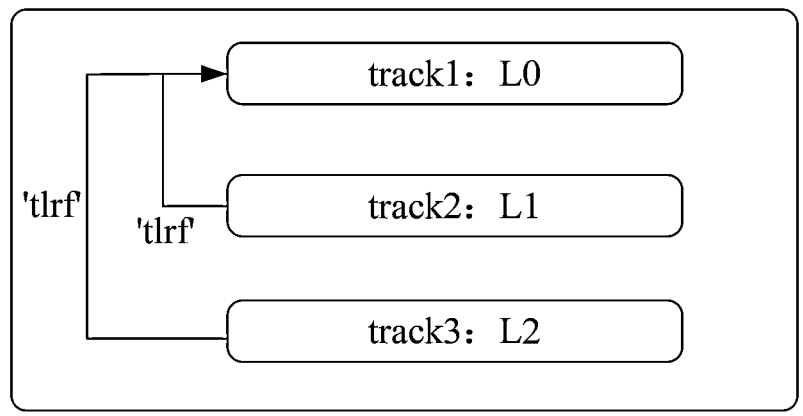
FIG. 6a shows a schematic diagram of a multi-temporal-domain multi-track encapsulating mode according to certain embodiment(s) of the present disclosure.

If the media data is video data, the content generation device is capable of encapsulating the media frames of the video data (or video content) of the N temporal domain layers into multiple different tracks, and the temporal domains of the tracks are not overlapped. The decoding consumption process of the content consumption device can be as shown in FIG. 6a, and as follows.

The content generation device performs coding and encapsulating on the video content A, and it is assumed that the video content A has three temporal domain layers L0-L2, the media frames of the three temporal domain layers are encapsulated into three different tracks respectively, where track1 is the base track, track2 and track3 are referred to the track1 in a "tlrf" type. In the base track, when being accumulated to each temporal domain layer, the corresponding frame rate and bit rate are as follows:

L0:20 fps, bitrate=1 mbps;
L1:30 fps, bitrate=1.5 mbps;
L2:60 fps, bitrate=3 mbps.

The content generation device is capable of transmitting the video file A to a user 1 and a user 2 according to the request of the content consumption device, the user 1 and the user 2 respectively receive the corresponding file A, and perform decoding consumption according to frame rate and bit rate information corresponding to each temporal domain layer in the track. In certain embodiment(s):

the decoding device of the content consumption device where the user 1 is located is good in performance, all media frames of track1 to track3 are selected to be reserved for decoding presentation, and thus an optimal watching effect is obtained; however, the decoding device of the content consumption device where the user 2 is located is poor in performance, all media frames of track1 are selected to be reserved, the media frames of track2 and track3 can be discarded, and only the reserved media frames of track1 are decoded for presentation.

In another implementation, if the multi-temporal-domain track identification field read by the content consumption device is the first numerical value, it indicates that the media frames of the N temporal domain layers are encapsulated into multiple different tracks, and the temporal domain layers in the tracks are overlapped, the content consumption device is capable of reading the values of the fields in track combination strategy information from the base track and reserving part or all of the temporal domain layers in the tracks matched with decoding performance of a decoding device according to the values of the fields in the track combination strategy information and the decoding performance of the decoding device. The temporal domain track indication information further includes the track combination strategy information; and the track combination strategy information includes the track identification field, the priority decoding presentation field, the alternative track field and the alternative track identification field. As shown in FIG. 6b, if the media data is video data, the content generation device is capable of encapsulating the media frames of the video data (or video content) of the N temporal domain layers into multiple different tracks, and the temporal domain layers of the tracks are overlapped, the specific decoding consumption process of the content consumption device is as follows.

The content generation device performs coding and encapsulating on the video content A, it is assumed that the video content A has three temporal domain layers L0-L2, and the media frames of the three temporal domain layers are respectively encapsulated into three different tracks, where track1 is the base track, track2 and track3 are referred to track1 in a "tlrf" type, track2 and track3 respectively contains a part of the media frames of L1 and L2 and are not overlapped with each other, the decoding of track2 and track3 depends on track1, but there is no dependency relationship between track2 and track 3. In the base track, the information of each track in combination is indicated as follows:

track1: is_output_track_flag=1; is_alternative_track_flag=0:
track2: is_output_track_flag=1; is_alternative_track_flag=0:
track3: is_output_track_flag=0; is_alternative_track_flag=1: alternative_track=2.

The content generation device is capable of transmitting the video file A to a user 1 and a user 2 according to the request of the content consumption device, the user 1 and the user 2 respectively receive the corresponding file A, and perform decoding consumption according to frame rate and bit rate information corresponding to each temporal domain layer in the track. In certain embodiment(s):

the decoding device of the content consumption device where the user 1 is located is good in performance, all media frames of track 1 to track 3 are selected to be reserved for decoding presentation, and thus an optimal watching effect is obtained; the decoding device of the content consumption device where the user 2 is located is poor in performance, all media frames of track1 and track1 are selected to be reserved, the media frame of track3 can be discarded, and the media frame in track1 is decoded for presentation.

In one embodiment, when reserving one or more media frames and decoding and presenting the reserved media frames of the temporal domain layer, the content consumption device is capable of re-sorting (reconstructing) the reserved one or more media frames by decoding time according to the decoding time of each media frame in the reserved one or more media frames, thus decoding and presenting the re-sorted one or more media frames. That is, when combining the media frames of different tracks, the content consumption device is capable of arranging all the media frames in the selected multiple tracks by decoding time according to the decoding time corresponding to each media frame during encapsulating, and performing decoding after reconstruction.

In the embodiments of the present disclosure, the content generation device is supported to encapsulate the media frames of the multi-temporal-domain layer to different tracks; and in the encapsulating process, the temporal domain track indication information is recorded in the description data box of each track, thus the tracks of different temporal domain layers are associated, the temporal domain layer information in the tracks is indicated, the base track is marked, and the strategy information of mutual combination of the tracks of the multi-temporal-domain layer is indicated. Therefore, the content consumption device can select a proper temporal domain layer according to the description data box in the track, and samples of different tracks are combined and are subjected to decoding presentation, thus the flexibility of multi-track encapsulation is ensured, and decoding computation resources are saved to the maximum extent.

The process of encapsulating the media data by the content generation device is described as follows in combination with FIG. 7. The content generation device can be a server or a terminal device. The server can be an independent server, a server cluster composed of multiple servers or a distributed system, and can also be a cloud server providing basic cloud computing services such as cloud services, cloud databases, cloud computing, cloud functions, cloud storage, network services, cloud communication, middleware services and artificial intelligence platforms. Referring to FIG. 7, which is a schematic flowchart of a media data processing method provided by an embodiment of the present disclosure, as shown in FIG. 7, the method may include:

S701. Determine a temporal domain layer of each media frame according to an inter-frame dependency relationship of each media frame in media data, to obtain the media frames of N temporal domain layers; N being a positive integer greater than 1.

S702. Encapsulate the media frames of the N temporal domain layers into M tracks respectively, and generate corresponding description data boxes; the description data box of a jth track in the M tracks including temporal domain track indication information, the temporal domain track indication information being used for indicating a track encapsulating mode of the N temporal domain layers, the temporal domain track indication information including temporal domain layer information of a temporal domain layer encapsulated into the jth track, and M being a positive integer greater than 1.

In S701 and S702, the inter-frame dependency relationship of each media frame in the media data can be as shown in FIG. 4, and the temporal domain layer of each media frame can be determined based on the inter-frame dependency relationship. The temporal domain track indication information includes a multi-temporal-domain track identification field, the multi-temporal-domain track identification field is used for indicating the track encapsulating mode of the N temporal domain layers; when the content generation device generates the description data box of the jth track according to the encapsulating process of the media frames, if the content generation device encapsulates multiple media frames of the N temporal domain layers into multiple different tracks, a generated value of the multi-temporal-domain track identification field is a first numerical value; and if the content generation device encapsulates multiple media frames of the N temporal domain layers into a single track, the generated value of the multi-temporal-domain track identification field is a second numerical value. In addition, the temporal domain track indication information further includes a total temporal domain layer number field; and when the content generation device generates the description data box of the jth track according to the encapsulating process of the media frames, a value of the total temporal domain layer number field will be generated according to the total number of temporal domain layers encapsulated into the M tracks.

The temporal domain layer information of the jth track includes a temporal domain layer number field, and when the content generation device generates the description data box of the jth track according to the encapsulating process of the media frames, a value of the temporal domain layer number field will be generated according to the number of temporal domain layers encapsulated into the jth track. In addition, the temporal domain layer information of the jth track includes a temporal domain layer identification field, a frame rate field and bit rate information; and when the content generation device generates the description data box of the jth track according to the encapsulating process of the media frames, a layer identification of an ith temporal domain layer in the temporal domain layers encapsulated into the jth track is stored into the temporal domain layer identification field, and a frame rate accumulated to the media frame of the ith temporal domain layer is stored into the frame rate field; and a bit rate accumulated to the media frame of the ith temporal domain layer is treated as the bit rate information. In one embodiment, the bit rate information includes a lower bit rate field and an upper bit rate field; and when the content generation device treats the bit rate accumulated to the media frame of the ith temporal domain layer as the bit rate information, lower 18 bits of the bit rate of the media frame of the ith temporal domain layer is stored into the lower bit rate field, and upper 12 bits of the bit rate of the media frame of the ith temporal domain layer is stored into the upper bit rate field.

The temporal domain track indication information further includes a base track identification field; when the content generation device generates the description data box of the jth track according to the encapsulating process of the media frame, if the jth track is a base track, a generated value of the base track identification field is a first numerical value; if the jth track is a non-base track, the generated value of the base track identification field is a second numerical value; and the media frame encapsulated in the base track is independently decoded. In addition, the temporal domain track indication information further includes a track combination strategy information, and the track combination strategy information includes a track identification field, a priority decoding presentation field, an alternative track field and an alternative track identification field; when the content generation device generates the description data box of the jth track according to the encapsulating process of the media frame, an identification of the track containing a part of temporal domain layer is stored in the track identification field; and if the jth track is a track subjected to priority decoding presentation, a generated value of the priority decoding presentation field is a first numerical value, and if the jth track is not the track subjected to priority decoding presentation, the generated value of the priority decoding presentation field is a second numerical value; if the jth track is an alternative track of one track, a generated value of the alternative track field is a first numerical value, and an identification of the track alternated by the jth track is stored in the alternative track identification field; and if the jth track is not the alternative track, the generated value of the alternative track field is a second numerical value, where the first value may be 1, and the second value may be 0.

In one embodiment, if the jth track is the non-base track, the content generation device will generate a track reference box of the jth track, the track reference box includes track reference type boxes; the track reference type boxes include a track identification field and a reference type identification field; and in addition, the content generation device is capable of storing an identification of the base track in the track identification field and referring the jth track to the base track according to the reference type identification field.

In this embodiment of the present disclosure, the content generation device is capable of determining the temporal domain layer of each media frame through the inter-frame dependency relationship among the media frames in the media data, respectively encapsulating the media frames of the N temporal domain layers into the M tracks, generating the description data box of the jth track based on the encapsulating process of the media frames, and setting corresponding values for each field included in the temporal domain track indication information in the description data box; therefore, the tracks of different temporal domain layers can be associated through the value of each field, the temporal domain layer information in the track can be indicated, the base track can be marked, and the strategy of mutual combination of the tracks of multiple temporal domain layers can be indicated, and as a result, the content consumption device and the media frame encapsulating process of the content generation device can be indicated; the content consumption device is capable of selecting a proper temporal domain layer for decoding presentation according to the value of each field in the description data box in the track, thus ensuring the flexibility of multi-track encapsulation, and saving the decoding computation resources to the maximum extent.

The method of this embodiment of the present disclosure is described, to facilitate better implementation of the solution of this embodiment of the present disclosure, an apparatus of this embodiment of the present disclosure is correspondingly provided below.

Figure 8:
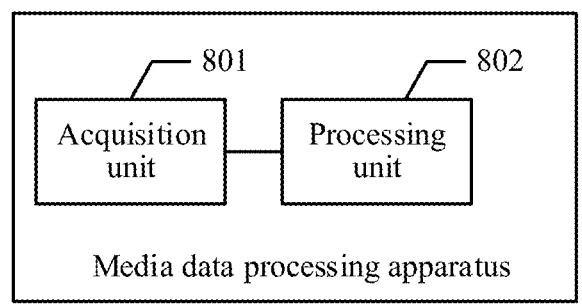
FIG. 8 shows a schematic structural diagram of a media data processing apparatus according to certain embodiment(s) of the present disclosure.

Referring to FIG. 8, FIG. 8 shows a schematic structural diagram of a media data processing apparatus provided by an exemplary embodiment of the present disclosure. The media data processing apparatus can be a computer program (including program codes) running in the content consumption device, for example, the media data processing apparatus can be application software in the content consumption device. As shown in FIG. 8, the media data processing apparatus may include: an acquisition unit 801 and a processing unit 802.

In an exemplary embodiment, the media data processing apparatus can be configured to execute corresponding steps in the method shown in FIG. 5; the media data includes multiple media frames, the multiple media frames are partitioned into N temporal domain layers and are encapsulated into M tracks, and M and N are positive integers greater than 1; and:

the acquisition unit 801 is configured to acquire a description data box of a jth track in the M tracks, the description data box includes temporal domain track indication information, the temporal domain track indication information is used for indicating a track encapsulating mode of the N temporal domain layers, the temporal domain track indication information includes temporal domain layer information of a temporal domain layer encapsulated into the jth track, j is a positive integer, and j≤M; and the processing unit 802 is configured to decode the media data according to the temporal domain track indication information.

In one embodiment, the temporal domain track indication information includes a multi-temporal-domain track identification field, and the multi-temporal-domain track identification field is used for indicating the track encapsulating mode of the N temporal domain layers.

When or in response to a determination that the multi-temporal-domain track identification field is a first numerical value, the multi-temporal-domain track identification field is used for indicating that the multiple media frames of the N temporal domain layers are encapsulated into multiple different tracks.

When or in response to a determination that the multi-temporal-domain track identification field is a second numerical value, the multi-temporal-domain track identification field is used for indicating that the multiple media frames of the N temporal domain layers are encapsulated into a single track.

In one embodiment, the temporal domain track indication information includes a total temporal domain layer number field; and the total temporal domain layer number field is used for indicating the total number of the temporal domain layers encapsulated into the M tracks.

In one embodiment, the temporal domain layer information of the jth track includes a temporal domain layer number field; and the temporal domain layer number field is used for indicating the number of the temporal domain layers encapsulated into the jth track.

In one embodiment, the temporal domain layer information of the jth track includes a temporal domain layer identification field, a frame rate field and bit rate information;

The temporal domain layer identification field is used for indicating a layer identification of an ith temporal domain layer in the temporal domain layers encapsulated into the jth track.

The frame rate field is used for indicating a frame rate accumulated to the media frame of the ith temporal domain layer.

The bit rate information is used for indicating a bit rate accumulated to the media frame of the ith temporal domain layer.

In one embodiment, the bit rate information includes a lower bit rate field and an upper bit rate field.

The lower bit rate field is used for indicating lower 18 bits of the bit rate accumulated to the media frame of the ith temporal domain layer.

The upper bit rate field is used for indicating upper 12 bits of the bit rate accumulated to the media frame of the ith temporal domain layer.

In one embodiment, the temporal domain track indication information includes a base track identification field; and the base track identification field is used for indicating whether the jth track is a base track.

When or in response to a determination that the base track identification field is a first numerical value, the base track identification field is used for indicating that the jth track is the base track; and when or in response to a determination that the base track identification field is a second numerical value, the base track identification field is used for indicating that the jth track is a non-base track.

The media frame encapsulated in the base track is independently decoded.

In one embodiment, the temporal domain track indication information further includes track combination strategy information, and the track combination strategy information includes a track identification field, a priority decoding presentation field, an alternative track field and an alternative track identification field.

The track identification field is used for indicating an identification of a track containing a part of temporal domain layers.

The priority decoding presentation field is used for indicating whether the jth track is a track subjected to priority decoding presentation or not; when or in response to a determination that the priority decoding presentation field is a first numerical value, the priority decoding presentation field is used for indicating that the jth track is the track subjected to priority decoding presentation; and when or in response to a determination that the priority decoding presentation field is a second numerical value, the priority decoding presentation field is used for indicating that the jth track is not the track subjected to priority decoding presentation.

The alternative track field is used for indicating whether the jth track is an alternative track of one track in the M tracks or not; when or in response to a determination that the alternative track field is a first numerical value, the alternative track field is used for indicating that the jth track is the alternative track of one track in the M tracks; and when or in response to a determination that the alternative track field is a second numerical value, the alternative track field is used for indicating that the jth track is not the alternative track.

The alternative track identification field is used for indicating an identification of one track alternated by the jth track.

In one embodiment, when or in response to a determination that the jth track is the non-base track, the jth track further includes a track reference box, and the track reference box includes track reference type boxes.

The track reference type boxes include a track identification field and a reference type identification field.

The track identification field is used for storing the identification of the base track, and the reference type identification field is used for indicating that the referred track is the base track.

In one embodiment, the processing unit 802 is further configured to: reserve the temporal domain layer matched with decoding performance of a decoding device in the N temporal domain layers according to the temporal domain track indication information and the decoding performance of the decoding device; and decode and present the media frame of the reserved temporal domain layer.

In one embodiment, the temporal domain track indication information includes the multi-temporal-domain track identification field, the temporal domain layer identification field, the frame rate field and the bit rate information, and the bit rate information includes the lower bit rate field and the upper bit rate field. The processing unit 802 is further configured to: read a value of the multi-temporal-domain track identification field in the temporal domain track indication information, when or in response to a determination that the read multi-temporal-domain track identification field is the second numerical value, indicate that the media frames of the N temporal domain layers are encapsulated into the single track, and read a value of the temporal domain layer identification field, a value of the frame rate field, as well as a value of the lower bit rate field and a value of the upper bit rate field in the bit rate information; and reserve the temporal domain layer matched with the decoding performance in the N temporal domain layers according to the value of the temporal domain layer identification field, the value of the frame rate field, as well as the value of the lower bit rate field and the value of the upper bit rate field in the bit rate information, and the decoding performance of the decoding device.

In one embodiment, the temporal domain track indication information includes the multi-temporal-domain track identification field, the temporal domain layer identification field, the frame rate field and the bit rate information, and the bit rate information includes the lower bit rate field and the upper bit rate field. The processing unit 802 is further configured to: read a value of the multi-temporal-domain track identification field in the temporal domain track indication information, when or in response to a determination that the read multi-temporal-domain track identification field is the first numerical value, indicate that the media frames of the N temporal domain layers are encapsulated into multiple different tracks, and when or in response to a determination that the temporal domain layers in the tracks are not overlapped, read a value of the temporal domain layer identification field, a value of the frame rate field, as well as a value of the lower bit rate field and a value of the upper bit rate field in the bit rate information from the base track; the media frame encapsulated in the base track are independently decoded; and reserve part or all of the temporal domain layers in the track matched with the decoding performance according to the value of the temporal domain layer identification field, the value of the frame rate field, as well as the value of the lower bit rate field and the value of the upper bit rate field in the bit rate information read from the base track, and the decoding performance of the decoding device.

In one embodiment, the temporal domain track indication information further includes track combination strategy information, and the track combination strategy information includes a track identification field, a priority decoding presentation field, an alternative track field and an alternative track identification field.

The processing unit 802 is further configured to indicate that the media frames of the N temporal domain layers are encapsulated into multiple different tracks and the temporal domain layers in the tracks are overlapped when or in response to a determination that the read multi-temporal-domain track identification field is the first numerical value, and read values of the fields in the track combination strategy information from the base track.

The processing unit 802 is further configured to reserve part or all of the temporal domain layers in the track matched with the decoding performance according to the values of the fields in the track combination strategy information and the decoding performance of the decoding device.

In one embodiment, the processing unit 802 is further configured to: re-sort the reserved one or more media frames by decoding time according to the decoding time of each media frame in the reserved one or more media frames; and decode and present the re-sorted one or more media frames.

In the embodiments of the present disclosure, a content generation device is supported to encapsulate the media frames of the multi-temporal-domain layer to different tracks; and in the encapsulating process, the temporal domain track indication information is recorded in the description data box of each track, thus the tracks of different temporal domain layers are associated, the temporal domain layer information in the tracks is indicated, the base track is marked, and the strategy information of mutual combination of the tracks of the multi-temporal-domain layer is indicated. Therefore, the processing unit 602 can select a proper temporal domain layer according to the description data box in the track, and samples of different tracks are combined and are subjected to decoding presentation, thus the flexibility of multi-track encapsulation is ensured, and decoding computation resources are saved to the maximum extent.

The method of this embodiment of the present disclosure is described, to facilitate better implementation of the solution of this embodiment of the present disclosure, an apparatus of this embodiment of the present disclosure is correspondingly provided below.

Figure 9:
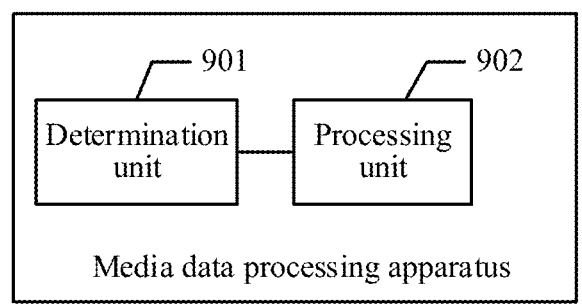
FIG. 9 shows a schematic structural diagram of a media data processing apparatus according to certain embodiment(s) of the present disclosure.

Referring to FIG. 9, FIG. 9 shows a schematic structural diagram of a media data processing apparatus provided by an exemplary embodiment of the present disclosure. The media data processing apparatus can be a computer program (including program codes) running in the content generation device, for example, the media data processing apparatus can be application software in the content generation device. As shown in FIG. 9, the media data processing apparatus may include: a determination unit 901 and a processing unit 902.

In an exemplary embodiment, the media data processing apparatus can be configured to execute corresponding steps in the method shown in FIG. 7; and: the determination unit 901 is configured to determine a temporal domain layer of each media frame according to an inter-frame dependency relationship of each media frame in the media data, to obtain the media frames of N temporal domain layers; N is a positive integer greater than 1; and the processing unit 902 is configured to encapsulate the media frames of the N temporal domain layers into M tracks respectively, and generate corresponding description data boxes; the description data box of a jth track in the M tracks includes temporal domain track indication information, the temporal domain track indication information is used for indicating a track encapsulating mode of the N temporal domain layers, the temporal domain track indication information includes temporal domain layer information of a temporal domain layer encapsulated into the jth track, and M is a positive integer greater than 1.

In one embodiment, the temporal domain track indication information includes a multi-temporal-domain track identification field, and the multi-temporal-domain track identification field is used for indicating the track encapsulating mode of the N temporal domain layers; and the processing unit 902 is further configured to: in response to encapsulating multiple media frames of the N temporal domain layers into multiple different tracks, generate a value of the multi-temporal-domain track identification field as a first numerical value; and in response to encapsulating the multiple media frames of the N temporal domain layers into a single track, generate the value of the multi-temporal-domain track identification field as a second numerical value.

In one embodiment, the temporal domain track indication information includes a total temporal domain layer number field; and the processing unit 902 is further configured to: generate a value of the total temporal domain layer number field according to the total number of temporal domain layers encapsulated into the M tracks.

In one embodiment, the temporal domain layer information of the jth track includes a temporal domain layer number field; and the processing unit 902 is further configured to: generate a value of the temporal domain layer number field according to the number of temporal domain layers encapsulated into the jth track.

In one embodiment, the temporal domain layer information of the jth track includes a temporal domain layer identification field, a frame rate field and bit rate information; and the processing unit 902 is further configured to: store a layer identification of an ith temporal domain layer in the temporal domain layer encapsulated into the jth track into the temporal domain layer identification field; store a frame rate accumulated to the media frame of the ith temporal domain layer into the frame rate field; and treat a bit rate accumulated to the media frame of the ith temporal domain layer as the bit rate information.

In one embodiment, the bit rate information includes a lower bit rate field and an upper bit rate field; and the processing unit 902 is further configured to: store lower 18 bits of the bit rate of the media frame of the ith temporal domain layer into the lower bit rate field; and store upper 12 bits of the bit rate of the media frame of the ith temporal domain layer into the upper bit rate field.

In one embodiment, the temporal domain track indication information includes a base track identification field; and the processing unit 902 is further configured to: when or in response to a determination that the jth track is a base track, generate a value of the base track identification field as a first numerical value; and when or in response to a determination that the jth track is a non-base track, generate a value of the base track identification field as a second numerical value.

The media frame encapsulated in the base track is independently decoded.

In one embodiment, the temporal domain track indication information further includes track combination strategy information, and the track combination strategy information includes a track identification field, a priority decoding presentation field, an alternative track field and an alternative track identification field; and the processing unit 902 is further configured to: store an identification of the track containing a part of temporal domain layer in the track identification field; when or in response to a determination that the jth track is a track subjected to priority decoding presentation, generate a value of the priority decoding presentation field as a first numerical value, and when or in response to a determination that the jth track is not the track subjected to priority decoding presentation, generate a value of the priority decoding presentation field as a second numerical value; and when or in response to a determination that the jth track is an alternative track of one track, generate a value of the alternative track field as a first numerical value, and store an identification of the track alternated by the jth track in the alternative track identification field; and when or in response to a determination that the jth track is not the alternative track, generate a value of the alternative track field as a second numerical value.

In one embodiment, the processing unit 902 is further configured to, when or in response to a determination that the jth track is the non-base track, generate a track reference box of the jth track, and the track reference box includes track reference type boxes. The track reference type boxes include a track identification field and a reference type identification field.

The processing unit 902 is further configured to store an identification of the base track in the track identification field, and refer the jth track to the base track according to the reference type identification field.

In this embodiment of the present disclosure, the processing unit 902 is capable of determining the temporal domain layer of each media frame through the inter-frame dependency relationship among the media frames in the media data, encapsulating the media frames of the N temporal domain layers respectively into the M tracks, generating the description data box of the jth track based on the encapsulating process of the media frames, and setting corresponding value for each field included in the temporal domain track indication information in the description data box; therefore, the tracks of different temporal domain layers can be associated through the value of each field, the temporal domain layer information in the track can be indicated, the base track can be marked, and the strategy of mutual combination of the tracks of multiple temporal domain layers can be indicated, and as a result, the content consumption device and the media encapsulating process of the processing unit 902 can be indicated; the content consumption device is capable of selecting a proper temporal domain layer for decoding presentation according to the value of each field in the description data box in the track, thus ensuring the flexibility of multi-track encapsulation, and saving the decoding computation resources to the maximum extent.

Figure 10:
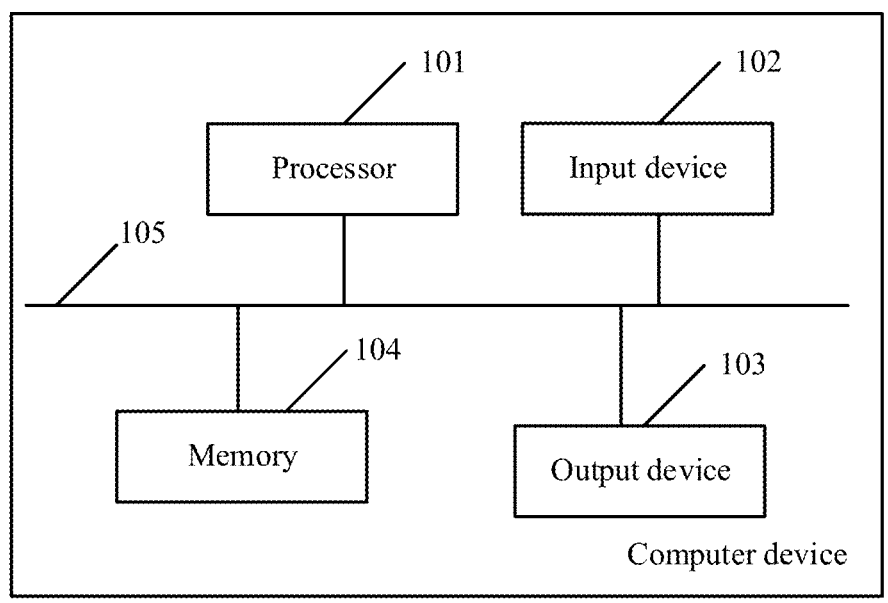
FIG. 10 shows a schematic structural diagram of a computing device according to certain embodiment(s) of the present disclosure.

Referring to FIG. 10, which is a schematic structural block diagram of a computing device provided by an embodiment of the present disclosure. The computing device can be the content consumption device or the content generation device; and the computing device can be a server or a terminal device. The computing device in the embodiment as shown in FIG. 10 may include: one or more processors 101, one or more input devices 102, one or more output devices 103 and a memory 104. The processors 101, the input devices 102, the output devices 103 and the memory 104 are connected through buses 105. The memory 104 is configured to store a computer program; the computer program includes a program instruction; and the processors 101 are configured to execute the program instruction stored in the memory 104.

The memory 104 may include a volatile memory, such as a random-access memory (RAM); the memory 104 may also include a non-volatile memory, such as a flash memory and a solid-state drive (SSD); and the memory 104 may also include a combination of the memories.

The processor 101 may be a central processing unit (CPU). The processor 101 may further include a hardware chip. The hardware chip may be an application-specific integrated circuit (ASIC), a programmable logic device (PLD) and the like. The PLD may be a field-programmable gate array (FPGA), a general array logic (GAL) and the like. The processor 101 may also be a combination of the structures.

In this embodiment of the present disclosure, the memory 104 is configured to store the computer program, the computer program includes the program instruction, and the processor 101 is configured to execute the program instruction stored in the memory 104, to implement the steps involved in the media data processing method in FIG. 5, where the media data includes multiple media frames, the multiple media frames are partitioned into N temporal domain layers and are encapsulated into M tracks, and M and N are positive integers greater than 1.

In one embodiment, the processor 101 is configured to call the program instruction to: acquire a description data box of a jth track in the M tracks, the description data box includes temporal domain track indication information, the temporal domain track indication information is used for indicating a track encapsulating mode of the N temporal domain layers, the temporal domain track indication information includes temporal domain layer information of a temporal domain layer encapsulated into the jth track, j is a positive integer, and j≤M; and decode the media data according to the temporal domain track indication information.

In one embodiment, the memory 104 is configured to store the computer program, and the computer program includes the program instruction; the processor 101 is configured to execute the program instruction stored in memory 104, also can be configured to implement the steps of the corresponding method as shown in FIG. 7.

In one embodiment, the processor 101 is configured to call the program instruction to: determine a temporal domain layer of each media frame according to an inter-frame dependency relationship of each media frame in the media data, to obtain the media frames of N temporal domain layers; N is a positive integer greater than 1; and encapsulate the media frames of the N temporal domain layers into M tracks respectively, and generate corresponding description data boxes; the description data box of a jth track in the M tracks includes temporal domain track indication information, the temporal domain track indication information is used for indicating a track encapsulating mode of the N temporal domain layers, the temporal domain track indication information includes temporal domain layer information of a temporal domain layer encapsulated into the jth track, and M is a positive integer greater than 1.

In addition, the embodiments of the present disclosure further provide a storage medium, the storage medium being configured to store a computer program, the computer program being configured to perform the method in the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure further provides a computer program product including instructions, the instructions, when run on a computer, causing the computer to perform the method according to the embodiments.

A person of ordinary skill in the art may understand that all or some of the processes of the methods in the embodiments may be implemented by a computer program instructing relevant hardware. The program may be stored in a computer-readable storage medium. During execution of the program, processes of the method embodiments may be included. The storage medium may be a magnetic disk, an optical disc, a read-only memory (ROM), a random access memory (RAM), or the like.

What are disclosed are merely examples of embodiments of the present disclosure, and are not intended to limit the protection scope of the present disclosure. Therefore, equivalent variations made in accordance with the claims of the present disclosure shall fall within the scope of the present disclosure.

What is claimed is:

1. A method of processing media data, the media data including multiple media frames, the multiple media frames being partitioned into N temporal domain layers and being encapsulated into M tracks, and M and N being positive integers greater than 1, the method being executed by a content consumption device and comprising:
    acquiring a description data box of a $j^{th}$ track in the M tracks, the description data box including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, j being a positive integer, and j≤M; and
    decoding the media data according to the temporal domain track indication information.

2. The method according to claim 1, wherein the temporal domain track indication information includes a multi-temporal-domain track identification field, the multi-temporal-domain track identification field being used for indicating the track encapsulating mode of the N temporal domain layers;
    in response to a determination that the multi-temporal-domain track identification field is a first numerical value, the multi-temporal-domain track identification field is used for indicating that the multiple media frames of the N temporal domain layers are encapsulated into multiple different tracks; and
    in response to a determination that the multi-temporal-domain track identification field is a second numerical value, the multi-temporal-domain track identification field is used for indicating that the multiple media frames of the N temporal domain layers are encapsulated into a single track.

3. The method according to claim 1, wherein the temporal domain track indication information includes a total temporal domain layer number field; the total temporal domain layer number field being used for indicating the total number of the temporal domain layers encapsulated into the M tracks.

4. The method according to claim 1, wherein the temporal domain layer information of the $j^{th}$ track includes a temporal domain layer number field; the temporal domain layer number field being used for indicating the number of the temporal domain layers encapsulated into the $j^{th}$ track.

5. The method according to claim 1, wherein the temporal domain layer information of the $j^{th}$ track includes a temporal domain layer identification field, a frame rate field and bit rate information,
    the temporal domain layer identification field being used for indicating a layer identification of an $i^{th}$ temporal domain layer in the temporal domain layers encapsulated into the $j^{th}$ track,
    the frame rate field being used for indicating a frame rate accumulated to the media frame of the $i^{th}$ temporal domain layer, and
    the bit rate information being used for indicating a bit rate accumulated to the media frame of the $i^{th}$ temporal domain layer.

6. The method according to claim 5, wherein the bit rate information includes a lower bit rate field and an upper bit rate field,
    the lower bit rate field being used for indicating lower 18 bits of the bit rate accumulated to the media frame of the $i^{th}$ temporal domain layer, and
    the upper bit rate field being used for indicating upper 12 bits of the bit rate accumulated to the media frame of the $i^{th}$ temporal domain layer.

7. The method according to claim 1, wherein the temporal domain track indication information includes a base track identification field; the base track identification field being used for indicating whether the $j^{th}$ track is a base track,
    in response to a determination that the base track identification field is a first numerical value, the base track identification field is used for indicating that the $j^{th}$ track is the base track,
    in response to a determination that the base track identification field is a second numerical value, the base track identification field is used for indicating that the $j^{th}$ track is a non-base track, and
    the media frame encapsulated in the base track being independently decoded.

8. The method according to claim 1, wherein the temporal domain track indication information further includes track combination strategy information, the track combination strategy information including a track identification field, a priority decoding presentation field, an alternative track field and an alternative track identification field,
    the track identification field being used for indicating an identification of a track containing a part of temporal domain layers,
    the priority decoding presentation field being used for indicating whether the $j^{th}$ track is a track subjected to priority decoding presentation or not,
    in response to a determination that the priority decoding presentation field is a first numerical value, the priority decoding presentation field is used for indicating that the $j^{th}$ track is the track subjected to priority decoding presentation,
    in response to a determination that the priority decoding presentation field is a second numerical value, the priority decoding presentation field is used for indicating that the $j^{th}$ track is not the track subjected to priority decoding presentation, the alternative track field being used for indicating whether the $j^{th}$ track is an alternative track of one track in the M tracks or not, in response to a determination that the alternative track field is a first numerical value, the alternative track field is used for indicating that the $j^{th}$ track is the alternative track of one track in the M tracks; when or in response to a determination that the alternative track field is a second numerical value, the alternative track field is used for indicating that the $j^{th}$ track is not the alternative track, and the alternative track identification field being used for indicating an identification of one track alternated by the $j^{th}$ track.

9. The method according to claim 1, wherein in response to a determination that the $j^{th}$ track is the non-base track, the $j^{th}$ track further includes a track reference box, the track reference box including track reference type boxes, the track reference type boxes including a track identification field and a reference type identification field, and the track identification field being used for storing the identification of the base track, and the reference type identification field being used for indicating that the referred track is the base track.

10. The method according to claim 1, wherein decoding the media data comprises:

reserving the temporal domain layer matched with decoding performance of a decoding device in the N temporal domain layers according to the temporal domain track indication information and the decoding performance of the decoding device; and decoding the media frame of the reserved temporal domain layer.

11. The method according to claim 10, wherein the temporal domain track indication information includes the multi-temporal-domain track identification field, the temporal domain layer identification field, the frame rate field and the bit rate information, the bit rate information including the lower bit rate field and the upper bit rate field, and reserving the temporal domain layer comprises:

reading a value of the multi-temporal-domain track identification field in the temporal domain track indication information, in response to a determination that the read multi-temporal-domain track identification field is the second numerical value, indicating that the media frames of the N temporal domain layers are encapsulated into the single track, and reading a value of the temporal domain layer identification field, a value of the frame rate field, as well as a value of the lower bit rate field and a value of the upper bit rate field in the bit rate information; and reserving the temporal domain layer matched with the decoding performance in the N temporal domain layers according to the value of the temporal domain layer identification field, the value of the frame rate field, as well as the value of the lower bit rate field and the value of the upper bit rate field in the bit rate information, and the decoding performance of the decoding device.

12. The method according to claim 10, wherein the temporal domain track indication information includes the multi-temporal-domain track identification field, the temporal domain layer identification field, the frame rate field and the bit rate information, the bit rate information comprising the lower bit rate field and the upper bit rate field, and reserving the temporal domain layer comprises:

reading a value of the multi-temporal-domain track identification field in the temporal domain track indication information, in response to a determination that the read multi-temporal-domain track identification field is the first numerical value, indicating that the media frames of the N temporal domain layers are encapsulated into multiple different tracks, and in response to a determination that the temporal domain layers in the tracks are not overlapped, reading a value of the temporal domain layer identification field, a value of the frame rate field, as well as a value of the lower bit rate field and a value of the upper bit rate field in the bit rate information from the base track; the media frame encapsulated in the base track being independently decoded; and reserving part or all of the temporal domain layers in the track matched with the decoding performance according to the value of the temporal domain layer identification field, the value of the frame rate field, as well as the value of the lower bit rate field and the value of the upper bit rate field in the bit rate information read from the base track, and the decoding performance of the decoding device.

13. The method according to claim 12, wherein the temporal domain track indication information further includes the track combination strategy information, the track combination strategy information including the track identification field, the priority decoding presentation field, the alternative track field and the alternative track identification field, and the method further comprises:

in response to a determination that the read multi-temporal-domain track identification field is the first numerical value, indicating that the media frames of the N temporal domain layers are encapsulated into multiple different tracks and the temporal domain layers in the tracks are overlapped, and reading values of the fields in the track combination strategy information from the base track; and reserving part or all of the temporal domain layers in the track matched with the decoding performance according to the values of the fields in the track combination strategy information and the decoding performance of the decoding device.

14. The method according to claim 10, wherein one or more media frames are reserved, and decoding the media frame of the reserved temporal domain layer comprises:

re-sorting the reserved one or more media frames by decoding time according to the decoding time of each media frame in the reserved one or more media frames; and decoding the re-sorted one or more media frames.

15. An apparatus of processing media data, the media data including multiple media frames, the multiple media frames being partitioned into N temporal domain layers and being encapsulated into M tracks, and M and N being positive integers greater than 1, the apparatus comprising: a memory storing computer program instructions; and a processor coupled to the memory and configured to execute the computer program instructions and perform:

acquiring a description data box of a $j^{th}$ track in the M tracks, the description data box including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, j being a positive integer, and j≤M; and decoding the media data according to the temporal domain track indication information.

16. The apparatus according to claim 15, wherein the temporal domain track indication information includes a multi-temporal-domain track identification field, the multi-temporal-domain track identification field being used for indicating the track encapsulating mode of the N temporal domain layers;

in response to a determination that the multi-temporal-domain track identification field is a first numerical value, the multi-temporal-domain track identification field is used for indicating that the multiple media frames of the N temporal domain layers are encapsulated into multiple different tracks; and in response to a determination that the multi-temporal-domain track identification field is a second numerical value, the multi-temporal-domain track identification field is used for indicating that the multiple media frames of the N temporal domain layers are encapsulated into a single track.

17. The apparatus according to claim 15, wherein the temporal domain track indication information includes a total temporal domain layer number field; the total temporal domain layer number field being used for indicating the total number of the temporal domain layers encapsulated into the M tracks.

18. The apparatus according to claim 15, wherein the temporal domain layer information of the $j^{th}$ track includes a temporal domain layer number field; the temporal domain layer number field being used for indicating the number of the temporal domain layers encapsulated into the $j^{th}$ track.

19. The apparatus according to claim 15, wherein the temporal domain layer information of the $j^{th}$ track includes a temporal domain layer identification field, a frame rate field and bit rate information, the temporal domain layer identification field being used for indicating a layer identification of an $i^{th}$ temporal domain layer in the temporal domain layers encapsulated into the $j^{th}$ track, the frame rate field being used for indicating a frame rate accumulated to the media frame of the $i^{th}$ temporal domain layer, and the bit rate information being used for indicating a bit rate accumulated to the media frame of the $i^{th}$ temporal domain layer.

20. A non-transitory computer-readable storage medium storing computer program instructions executable by at least one processor to perform a method of processing media data, the media data including multiple media frames, the multiple media frames being partitioned into N temporal domain layers and being encapsulated into M tracks, and M and N being positive integers greater than 1, the apparatus comprising: a memory storing computer program instructions, the method including:

acquiring a description data box of a $j^{th}$ track in the M tracks, the description data box including temporal domain track indication information, the temporal domain track indication information being used for indicating a track encapsulating mode of the N temporal domain layers, the temporal domain track indication information including temporal domain layer information of a temporal domain layer encapsulated into the $j^{th}$ track, j being a positive integer, and j≤M; and decoding the media data according to the temporal domain track indication information.

\* \* \* \* \*